C. A. SMITH.
SELF LEVELING TABLE.
APPLICATION FILED JUNE 2, 1913.
1,081,339.
Patented Dec. 16, 1913.
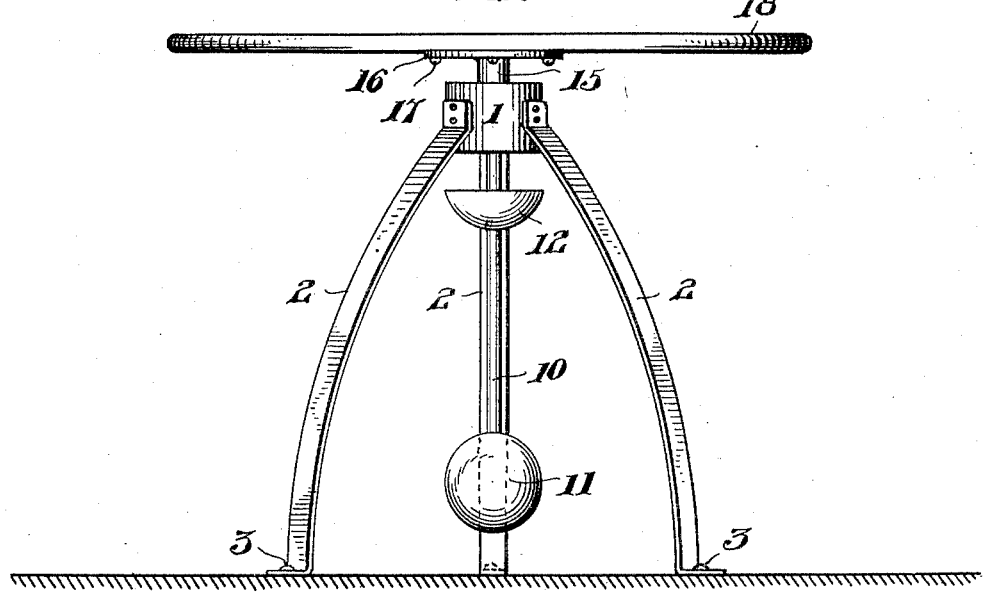
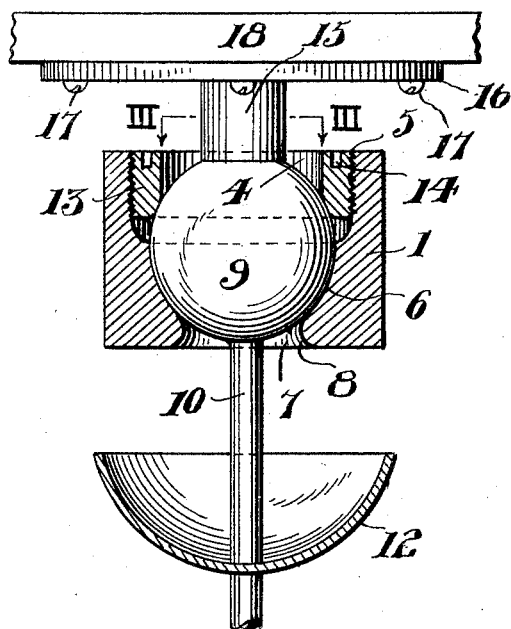
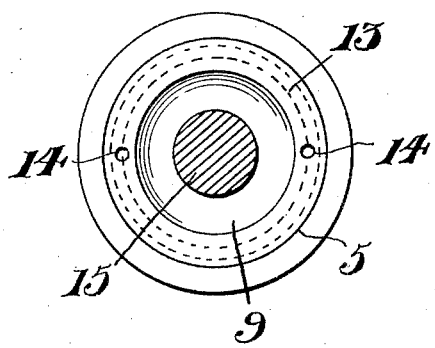
WITNESSES
INVENTOR
Charles A. Smith
By Henry C. Evert
ATTORNEY

UNITED STATES PATENT OFFICE.

CHARLES A. SMITH, OF SCALP LEVEL, PENNSYLVANIA.

SELF-LEVELING TABLE.

1,081,339.  Specification of Letters Patent.  Patented Dec. 16, 1913.

Application filed June 2, 1913.  Serial No. 771,141.

*To all whom it may concern:*

Be it known that I, CHARLES A. SMITH, a citizen of the United States of America, residing at Scalp Level, in the county of Cambria and State of Pennsylvania, have invented certain new and useful Improvements in Self-Leveling Tables, of which the following is a specification, reference being had therein to the accompanying drawing.

This invention relates to tables especially designed for ocean and river crafts, Pullman cars and vehicles.

The primary object of my invention is to provide simple and effective means in connection with a table for holding the top thereof in a horizontal position and thereby prevent articles from being upset and liquid from being spilled upon the table top when the supports of the table assume a position at an inclination to the table top.

Another object of this invention is to provide a table having a support and table top with a ball and socket connection between said support and said table top that permits of the table top being maintained in a horizontal position relatively to the support.

A further object of this invention is to provide a counter-balanced table consisting of comparatively few parts that are inexpensive to manufacture, easy to assemble, durable and neat in appearance.

I attain the above objects by a mechanical construction that will be hereinafter specifically described and then claimed.

Reference will now be had to the drawing, wherein:—

Figure 1 is a side elevation of a table in accordance with this invention, Fig. 2 is an enlarged vertical sectional view of the ball and socket connection of the table, and Fig. 3 is a horizontal sectional view taken on the line III—III of Fig. 2.

A table in accordance with this invention comprises a cylindrical support 1 provided with a plurality of bowed legs 2 that have the lower ends thereof secured to a floor or other support, as at 3. The support 1 is provided with a cylindrical recess 4 having the walls thereof screw threaded, as at 5. The bottom of the recess terminates in a concave socket 6 having a central opening 7 and the walls of said opening are convex, as at 8.

Movable in the socket 6 is a ball or spherical body 9 provided with a pendulum 10 having a weight 11 at the lower end thereof. The pendulum 10 extends through the opening 7 and is capable of swinging therein. The pendulum 10, adjacent to the opening 7 has an oil cup 12 that permits of the lubricating oil used in connection with the ball and socket from injuring the floor or surface upon which the table is placed. The ball is retained in the socket 6 by a collar or nut 13 screwed into the recess 4, said collar or nut having diametrically opposed recesses or sockets 14 to accommodate a spanner wrench or other instrument employed for screwing the collar or nut into the recess. The top of the ball 9 is provided with a post 15 having a circular plate 16, and secured to said plate by screws 17 or other fastening means is a table top 18. The post 15 longitudinally alines with the pendulum 10 and the area of the recess 4 and the opening 7 is such that the support 1 can be tilted while the pendulum 10 maintains the table top 18 in a horizontal position.

The ball and socket can be easily lubricated to insure an easy and noiseless movement of the movable elements of the table relatively to those held stationary.

One embodiment of the invention has been illustrated, but it is to be understood that the structural elements are susceptible to such variations and modifications as fall within the scope of the appended claim.

What I claim is:—

A self-leveling table comprising a cylindrical member formed with a cylindrical recess having the wall thereof threaded, said member further provided with a concave socket opening into said recess and said member further having an opening centrally of its bottom communicating with said socket, a spherical body mounted in said socket and projecting into said recess, said body engaging the wall of said socket throughout, a peripherally threaded collar engaging with said threads for maintaining said body in said socket, said collar flush with the top of said member, a weighted pendulum depending from said body, a cylindrical post projecting from said body and of greater diameter than said pendulum, a plate carried by the post, a table top secured to said plate, and a plurality of legs for supporting said member.

In testimony whereof I affix my signature in the presence of two witnesses.

CHARLES A. SMITH.

Witnesses:
CARL FREDRICK LINDSTROM,
JOHN LINDSTROM.